United States Patent Office 3,288,437
Patented Nov. 29, 1966

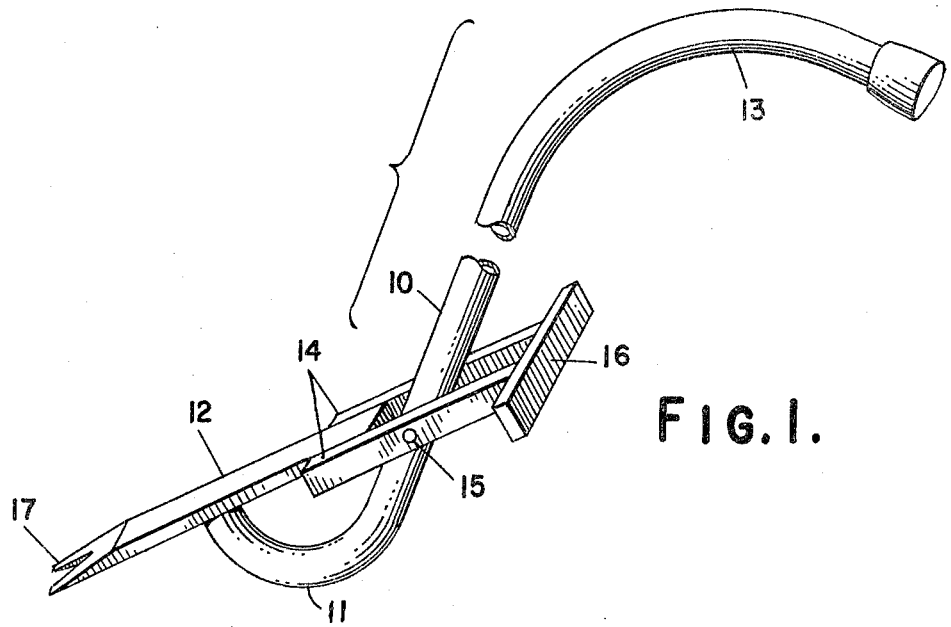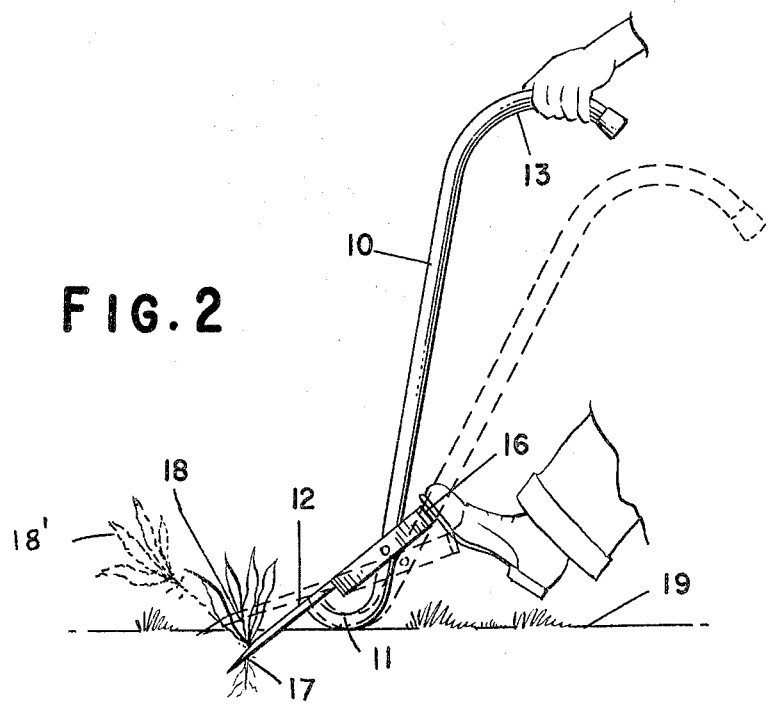

3,288,437
GARDEN WEEDING TOOL
Robert O. Pederson, 3687 Paloma Drive, Ventura, Calif.
Filed Apr. 22, 1965, Ser. No. 450,108
1 Claim. (Cl. 254—132)

This invention relates generally to garden tools and more particularly to a novel tool designed for pulling weeds from the ground.

Conventional weeding tools usually comprise a handle terminating in a simple V-shaped fork-like structure for engaging the roots of the weed. The entire tool is of relatively small size so that in using the tool, a gardener must squat or be on his hands and knees. In addition, considerable work may be involved on the weed, particularly if the weed is deep rooted and fairly well entrenched.

With the foregoing considerations in mind, it is a primary object of this invention to provide an improved weeding tool in which the foregoing difficulties are overcome.

More particularly, it is an object to provide a weeding tool which a gardener may use while standing up, to the end that weeds may be pulled more rapidly.

Another important object is to provide a tool which may be used standing up for pulling weeds wherein the gardener may use his foot to apply additional force in embedding the tool prior to extripating the weed.

Still another object is to provide an improved weed pulling tool so designed as to enable the gardener to exert considerable leverage in an upward direction on the weed itself to facilitate pulling of particularly stubborn weeds.

Briefly, these and many objects and advantages of this invention are attained by providing a tool in the form of an elongated straight tubular section terminating at its lower end in a forwardly and upwardly curved portion defining a bearing section. The upper end of the tubular member in turn curves rearwardly and downwardly slightly to define a convenient holding handle. The length of the straight portion is sufficient so that a gardener may stand erect while operating the tool.

A weed engaging means in the form of a forked plate is secured to the elongated member immediately above the bearing section and is preferably sloped in a downward direction. The arrangement is such that the fork in the form of a V-shape notch may be embedded into the weed roots and then the entire tool rocked about the bearing section to apply leverage and thereby extirpate the weed.

A better understanding of the invention will be had by now referring to the preferred embodiment thereof as illustrated in the accompanying drawings, in which:

FIGURE 1 is a fragmentary perspective view of the weeding tool of this invention; and, FIGURE 2 is a side elevational view of the tool useful in explaining the operation thereof.

Referring to FIGURE 1, the tool comprises an elongated central straight portion 10, preferably tubular in form, which is of a length sufficient to reach the ground when a person uses the tool in a standing position. The length of the section 10 is broken away in FIGURE 1 in order to accommodate the tool on the drawing.

As shown, the straight portion 10 terminates at its lower end in a forwardly and upwardly curved portion 11 defining a bearing section serving in part to support a weed engaging means in the form of a plate 12. The plate 12 is disposed in a downwardly, forwardly sloping position. The upper end of the elongated straight portion 10 curves rearwardly and downwardly to define a handle 13.

As shown in detail in FIGURE 1, the weed engaging structure in the form of the plate 12 includes a securing means in the form of a pair of brackets 14 secured to the plate 12 and riveted as at 15 to a point on the lower end of the straight portion 10 immediately above the initial portion of the curved section 11. The extreme rearward end of the brackets 14 support a foot pedal 16.

The forward end of the plate 12 in turn includes a fork-like V-shaped weed engaging structure 17. The plate 12 receives additional support as already described by being secured to the extreme end of the curved section 11 on its underside. This securement may be by welding the upwardly extending end of the curved section to the plate 12.

Referring now to FIGURE 2, the preferred manner of operating the weeding tool of this invention will be understood. The tool is initially disposed close to a vertical position opposed to a weed. The operator may then place his foot on the foot pedal 16 with the V-shaped fork structure 17 initially on the surface of the ground. The entire structure is then skidded forwardly on the bearing section 11 to wedge the fork 17 into the roots of a weed such as the weed 18. In the solid line position illustrated in FIGURE 2, the tool is shown in a proper position after the forward skidding movement to embed the fork 17.

After the fork 17 has been embedded in the roots of the weed, it is a simple matter for the operator to then swing the handle 13 downwardly to rock the tool about the bearing section 11. This action lifts the fork 17 thus extirpating the weed and flinging it up from the ground as indicated by the dotted lines 18' in FIGURE 2.

It will be understood accordingly, that only two simple motions are necessary in removing a weed. First, the operator skids the tool forwardly along the bearing section 11 by using the foot rest 16 and guiding the tool with his hand on the handle 13 to embed the fork. Second, the entire tool is then rocked backwardly about the curved bearing section 11 thereby plucking up the weed.

In view of the elongated nature of the handle, considerable leverage may be readily applied to the weed with very little exertion on the part of the gardener. In addition, the gardener, as will be evident from the drawing in FIGURE 2, may operate the tool while standing up thereby enabling him to walk along a row of weeds while removing them as opposed to crawling on his hands and knees.

From the foregoing description, it will thus be evident that the present invention has provided a greatly improved garden tool in which weeding operations are greatly simplified.

While only one particular embodiment has been set forth and described, various changes that fall within the scope and spirit of this invention will occur to those skilled in the art. The garden weeding tool is therefore not to be thought of as limited to the exact structure set forth merely for illustrative purposes.

What is claimed is:

A garden weeding tool comprising: an elongated tubular member having a central straight portion extending downwardly to terminate in a lower end portion curving forwardly and upwardly to define an arcuate bearing section and having an upper end portion curving rearwardly and downwardly to define a handle; and a weeding structure including an elongated downwardly sloping plate terminating in a V-shaped fork at its lower forward end, the other end of said plate including means securing it adjacent to a point on the lower portion of said tubular member slightly above the initial portion of said bearing section, said means extending past said point in an upward, rearward direction to terminate in a foot pedal, the extreme end of said lower end portion of said elongated member being secured to the underside of said plate to provide a support therefor, said arcuate bearing section serving as a rocking means for said plate to facilitate lifting said V-shaped fork in removing a weed upon downward swinging movement of said handle.

References Cited by the Examiner

UNITED STATES PATENTS

| | | | |
|---|---|---|---|
| 1,007,656 | 10/1911 | Fox | 254—132 |
| 1,857,500 | 5/1932 | Davison | 254—132 |
| 2,507,948 | 5/1950 | Armstrong | 294—50.6 |
| 3,138,365 | 6/1964 | Rundle | 254—132 |

WILLIAM FELDMAN, *Primary Examiner.*

OTHELL M. SIMPSON, *Examiner.*